Feb. 6, 1940. J. INZERILLO 2,189,520
WINDOW SEAT
Filed Jan. 30, 1939
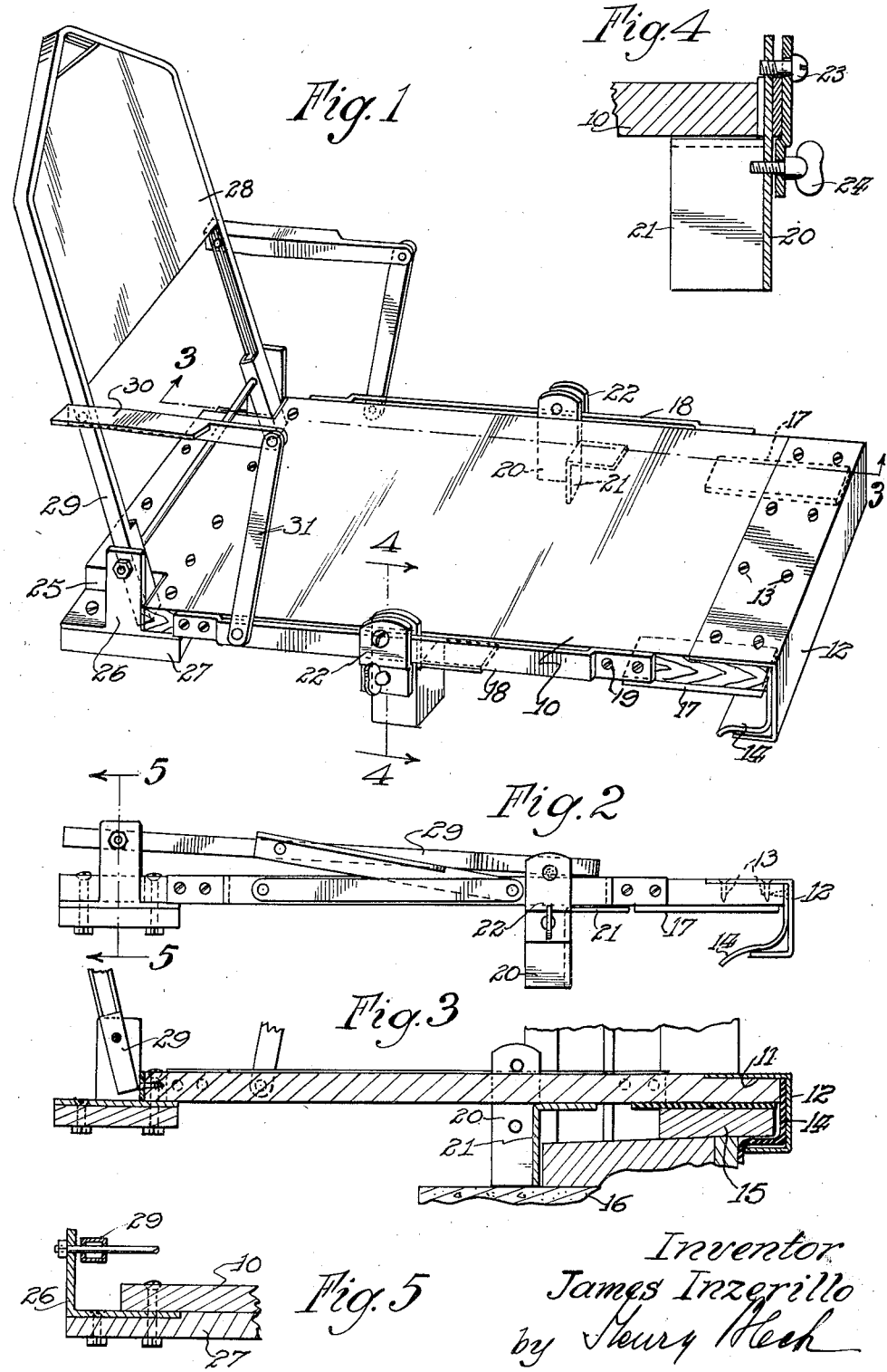
Inventor
James Inzerillo
by Henry Hech
Attorney.

Patented Feb. 6, 1940

2,189,520

UNITED STATES PATENT OFFICE 2,189,520

WINDOW SEAT

James Inzerillo, Chicago, Ill.

Application January 30, 1939, Serial No. 253,513

2 Claims. (Cl. 304—24)

The invention relates to seats for window washers.

It is an object of the invention to provide a seat with a back and adjustable securing means which may be folded into compact form when not in use.

A further object constitutes the provision of a seat in which the securing and adjustment are arranged so as not to interfere with the seat surface.

Another object aims at providing certain features of construction and arrangement tending to enhance the utility and efficiency of a device of the character described.

With these and other objects in view, which will become apparent from a perusal of the invention, the latter comprises the means described in the following specification, particularly pointed out in the claims forming a part thereof, and illustrated in the accompanying drawing, in which:

Fig. 1 is a perspective view of a seat constructed in accordance with my invention.

Fig. 2 is a side view of the seat in folded or collapsed condition.

Fig. 3 is a section on the line 3—3 of Fig. 1.

Fig. 4 is a detail section on the line 4—4 of Fig. 1, and

Fig. 5 is a detail section on the line 5—5 of Fig. 2.

Referring to the several views in the drawing, the seat comprises a seating member or platform 10 which, at the forward end, is recessed as at 11 to receive the horizontal part of a U-member 12, which encompasses the front end of the platform and is secured thereto by a plurality of screws 13.

The U-member 12 extends below the member 10 and is lined with a layer of rubber 14, which extends beyond the end of the lower horizontal leg of the U-member to protect the stool 15 of the window frame 16 against damage.

Rubber strips 17 on the underside of the seat member 10 further contribute toward leaving the window stool 15 undamaged during use. To each side of the seating member is secured a bar 18 whose ends are offset and secured to the member 10 by screws 19, so that the main portion of the bar is parallel to, but spaced from, the member to provide a clearance for a vertical plate 20 which, at the lower end, is formed integral with an angle iron 21, whose vertical leg is adapted to engage the inner side of the window stool, whereas the horizontal leg bears against the underside of the seat member. A clamping plate 22 on the outside of the bar 18 is secured by screws 23 and 24 to the plate 20 to secure the same on the bar.

It is evident that the angle irons 21 may be adjusted on the bar to fit various sizes of window stools.

The rear end of the seat member 10 has its corners cut away as at 25, to provide clearance for an angle bracket 26, secured to a cross board 27 secured to the underside of the seat member.

A back 28 is secured in a bar frame 29 which, adjacent to its free end, is pivotally secured to the bracket 26, and its extremities are adapted to engage one edge of the cut out portion 25 to limit the extent to which the back may be swung rearwardly.

Side arms 30 are secured to the frame 29 and are articulated at the forward end with links 31, whose other end is pivoted to the bars 18.

Thus a seat with a back and side arm is provided, which may be collapsed as shown in Fig. 2 to provide a compact seat.

The use of the seat is thought to be obvious. The seat is arranged to encompass with its U-member the inside of the window stool 15, whereupon the angle irons 21 are adjusted to fit the particular width of the window stool. Thereupon the back is placed in substantially vertical position. If, of course, the angle irons are once adjusted, then no further adjustment is necessary for windows having the same sill dimensions.

Attention is called to the fact that the seating surface of the seat is smooth and free of slots or upstanding members, so that a comfortable seat is provided.

While the drawing shows a preferred embodiment of the invention, numerous changes and alterations may be made without departing from the scope and spirit of the invention, as defined in the appended claims.

I claim:

1. A window seat comprising a seat member, a U-member to encompass a window sill attached to the front end of said seat, a bar secured to each side of the seat having offset ends, the main portions of said bars being spaced from and parallel to the sides of the seat, and abutments mounted on the main portions of the bars and movable to engagement with the outer face of the window sill, said abutments comprising vertical plates formed into angle irons at their lower surfaces, the vertical legs of the angle irons adapted to engage the inner side of the window sill, and the horizontal leg of the angle iron lying against the under side of the seat member.

2. A window seat comprising a seat member, a U-member to encompass a window sill attached to the front end of said seat, a bar secured to each side of the seat having offset ends, the main portions of said bars being spaced from and parallel to the sides of the seat, abutments mounted on the main portions of the bars and movable to engagement with the outer face of the window sill, and clamping plates secured to the upper ends of the abutments and engaging the main portion of the bar to clamp the abutments at different positions along the bar.

JAMES INZERILLO.